(12) United States Patent
Wang et al.

(10) Patent No.: US 10,703,881 B2
(45) Date of Patent: Jul. 7, 2020

(54) POLYMER ELECTROLYTE AND ELECTROCHROMIC DEVICES INCLUDING POLYMER ELECTROLYTE

(71) Applicant: FURCIFER INC., Menlo Park, CA (US)

(72) Inventors: Chao Wang, Menlo Park, CA (US); Yan Zhou, Fremont, CA (US)

(73) Assignee: FURCIFER INC., Fremont, CA (US)

( * ) Notice: Subject to any disclaimer, the term of this patent is extended or adjusted under 35 U.S.C. 154(b) by 27 days.

(21) Appl. No.: 15/729,115

(22) Filed: Oct. 10, 2017

(65) Prior Publication Data

US 2018/0100056 A1 Apr. 12, 2018

Related U.S. Application Data

(60) Provisional application No. 62/406,778, filed on Oct. 11, 2016.

(51) Int. Cl.
G02F 1/15 (2019.01)
G02F 1/03 (2006.01)
G02F 1/153 (2006.01)
G09G 3/19 (2006.01)
C08K 5/43 (2006.01)
C08K 3/10 (2018.01)
C08K 5/06 (2006.01)
G02F 1/1343 (2006.01)
G02F 1/155 (2006.01)

(52) U.S. Cl.
CPC ............... C08K 5/43 (2013.01); C08K 3/10 (2013.01); C08K 5/06 (2013.01); G02F 1/13439 (2013.01); G02F 1/15 (2013.01); G02F 1/155 (2013.01); C08K 2201/001 (2013.01); G02F 2001/164 (2019.01)

(58) Field of Classification Search
CPC .... G02F 1/1523; G02F 1/1525; G02F 1/1521; G02F 1/1533; G02F 1/155; G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 438/929; 250/70
See application file for complete search history.

(56) References Cited

U.S. PATENT DOCUMENTS

| 5,407,593 A | 4/1995 | Whang |
| 5,859,723 A | 1/1999 | Jodicke et al. |
| 6,361,709 B1 | 3/2002 | Bauer et al. |
| 6,465,135 B1 | 10/2002 | Nishimura et al. |

(Continued)

FOREIGN PATENT DOCUMENTS

| CN | 101130587 A | 2/2008 |
| CN | 105585724 A | 5/2016 |

(Continued)

OTHER PUBLICATIONS

International Search Report and Written Opinion for Application No. PCT/US2017/055896, dated Dec. 12, 2017 11 pages.

(Continued)

Primary Examiner — Dawayne Pinkney

(57) ABSTRACT

The disclosure relates generally to a solid polymer electrolyte for use in electrochromic devices. The solid polymer electrolyte may include a framework of one or more polar crystalline polymers, one or more polar amorphous polymers, and one or more electrolyte salts.

13 Claims, 4 Drawing Sheets

(56) References Cited

U.S. PATENT DOCUMENTS

| | | | |
|---|---|---|---|
| 6,645,675 B1 | 11/2003 | Munshi | |
| 6,667,825 B2 | 12/2003 | Lu et al. | |
| 2015/0062687 A1 | 3/2015 | Milliron et al. | |
| 2015/0219974 A1* | 8/2015 | Trajkovska-Broach | ..................... G02F 1/1525 359/275 |
| 2016/0276109 A1 | 9/2016 | Krishnan et al. | |

FOREIGN PATENT DOCUMENTS

| | | |
|---|---|---|
| WO | 2013/154779 A1 | 10/2013 |
| WO | 2014/121263 A1 | 8/2014 |

OTHER PUBLICATIONS

Chen, R. et al., "Electrodeposition of silver telluride thin films from non-aqueous baths," Electrochimica Acta, 2004, vol. 49, Issue 14, p. 2243-2248.

Search Report for European Application No. 17860184.5, dated Apr. 2, 2020, 9 pages.

\* cited by examiner

POLYMER ELECTROLYTE AND ELECTROCHROMIC DEVICES INCLUDING POLYMER ELECTROLYTE

CROSS-REFERENCE TO RELATED APPLICATION

This application is based on and claims priority to U.S. Provisional Application No. 62/406,778, filed Oct. 11, 2016, entitled "Polymer Electrolyte and Electrochromic Devices Including Polymer Electrolyte." The entire contents of the above-referenced application are all incorporated herein by reference.

TECHNICAL FIELD

The present disclosure relates generally to a solid polymer electrolyte, for example, for use in electrochromic devices.

BACKGROUND

Electrochromism generally refers to a reversible change in optical properties of a material upon application of a potential. In particular, electrochromic materials exhibit a reversible color change due to an electrochemical reduction-oxidation (redox) reaction caused by application of an electric field. Electrochromic materials may include both organic and inorganic materials.

Electrochromic materials are commonly used in electrochromic devices. A typical electrochromic device includes a four layer assembly: (i) a first transparent electrically conductive film, (ii) an electrochromic material (organic or inorganic) deposited on the first conductive film, (iii) a second transparent electrically conductive film spaced apart from the first conductive film, and (iv) an ionic conductive medium (electrolyte) disposed between the electrochromic material and the second conductive film. It has been found that the inclusion of only one electrochromic film may result in electrochromic devices with shortened lives. Accordingly, a second electrochromic material film may be deposited between the ionic conductive medium and the second conductive film noted above to facilitate completion of the redox process in the device and reduce or eliminate degradative reactions in the electrolyte. This five layer assembly may be used to obtain two mixed colored states or, may, using two materials with complementary optical characteristics, enhance the contrast between the previously defined states.

Currently, forming the electrolyte layer with suitable materials remains a huge challenge. The development of electrochromic devices has been greatly restricted by the development of highly stable and transparent electrolytes. Previous electrochromic devices may use liquid/gel electrolytes or inorganic solid ion conductors. Liquid/gel electrolytes, most of which are organic solvent-based (e.g., carbonate, acetonitrile, etc.) electrolytes, have leakage of the liquid electrolyte, evaporation and exhaustion of the organic solvent, and potential safety issues. Inorganic solid electrolytes (e.g., LiPON, etc.) need high vacuum pressure to evaporate/sputter and thus often have high cost. In addition, inorganic solid electrolyte has poor mechanical flexibility.

There are several problems associated with known electrochromic devices and/or the components thereof. U.S. Pat. No. 6,667,825 ('825 patent) discloses an electrochromic device utilizing two conjugated polymer coated ITO-coated glass electrodes, and an ionic liquid such as [BMIM][$BF_4$] as the electrolyte. The [BMIM][$BF_4$] liquid electrolyte of the '825 patent does not include a Lewis acid, which results in improved stability and lifespan of the electrochromic device. Further, the electrochromic device of the '825 patent may avoid, at least in part, issues arising with residual images after quenching and electrolyte decomposition that are typically found in devices using organic solvent-based liquid electrolytes and ionic liquid electrolytes containing a Lewis acid. However, the electrochromic device of the '825 patent is still subject to problems associated with leakage of the liquid electrolyte, and the inability to be formed into thin films and film-shaped products.

In order to complement such disadvantages of liquid electrolytes, solid polymer electrolytes have appeared recently. S. A. Agnihotry discloses a polymer electrolyte having a high ionic conductivity of $10^{-3}$ S/cm at room temperature, the polymer electrolyte being formed by adding a small amount of PMMA (polymethyl methacrylate) polymer and fumed silica to an electrolyte formed of propylene carbonate containing 1M $LiClO_4$ added thereto (see, Electrochimica Acta, 2004, 49: 2343-2349). However, because the above polymer electrolyte still uses an organic solvent as electrolyte, this device still has several disadvantages such as low quenching rate, residual images after quenching, decomposition and exhaustion of organic solvent-based electrolytes, or the like. In addition, because of the swollen states of the above polymers, the interfaces and the phases of the above polymers are relatively unstable. Over time, the interfaces of the above polymers may change easily, leading to the failure of electrochromic devices.

Accordingly, there is a need in the art for an improved solid polymer electrolyte suitable for use in electrochromic devices.

BRIEF SUMMARY

One aspect of the present disclosure is directed to a solid polymer electrolyte. In some embodiments, the solid polymer electrolyte may comprise a framework of one or more polar crystalline polymers, one or more polar amorphous polymers, and one or more electrolyte salts.

Another aspect of the present disclosure is directed to an electrochromic device. In some embodiments, the electrochromic device comprises a first electrode, a second electrode, an electrochromic material deposited on at least the first electrode, and a solid polymer electrolyte disposed between the electrochromic material and the second electrode. The solid polymer electrolyte may comprise a framework of one or more polar crystalline polymers, one or more polar amorphous polymers, and one or more electrolyte salts.

Another aspect of the present disclosure is directed to a method of making a solid polymer electrolyte. In some embodiments, the method comprises forming the solid polymer electrolyte by microphase separation of multiple materials. The multiple materials may comprise one or more polar crystalline polymers, one or more polar amorphous polymers, and one or more electrolyte salts. The one or more polar crystalline polymers, the one or more polar amorphous polymers, and the one or more electrolyte salts are blended together into a transparent film by using solution processing or extrusion.

Other objects, features and advantages of the described embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

Figure 1:
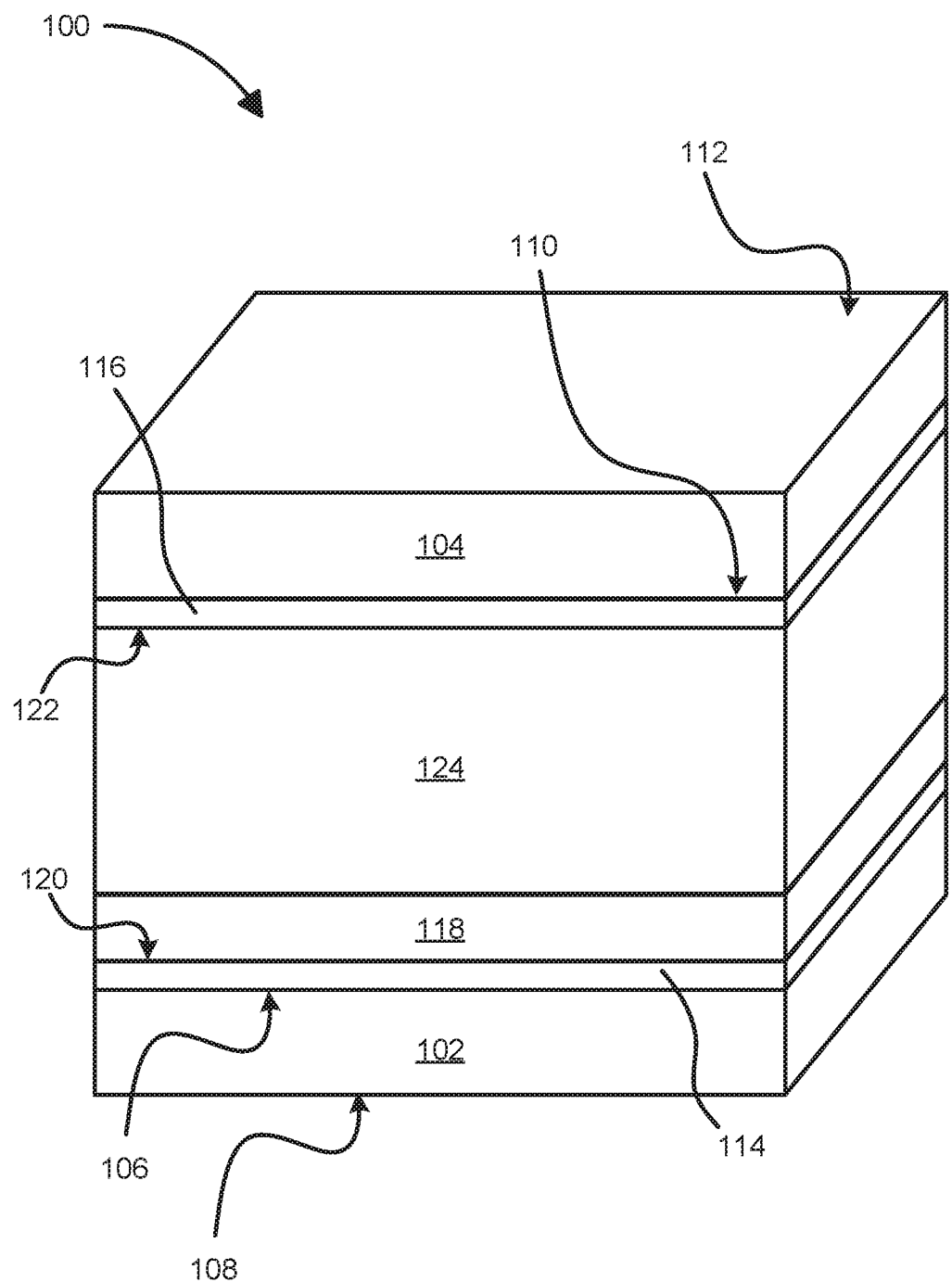
FIG. 1 is a sectional view of a simplified schematic of an electrochromic device comprising a solid polymer electrolyte therein, according to one exemplary embodiment.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Unless the context requires otherwise, throughout the present specification and claims, the word "comprise" and variations thereof, such as, "comprises" and "comprising" are to be construed in an open, inclusive sense, that is as "including, but not limited to". Numeric ranges are also inclusive of the numbers defining the range. Additionally, the singular forms "a", "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

"Optional" or "optionally" means that the subsequently described event of circumstances may or may not occur, and that the description includes instances where said event or circumstance occurs and instances in which it does not. For example, "optional second layer" means that the second layer may or may not be included.

Embodiments disclosed herein are directed to solving the problems associated with current electrochromic devices using conventional liquid or polymer electrolytes. For instance, embodiments disclosed herein are directed to a novel transparent solid polymer electrolyte for use in an electrochromic device, where the solid polymer electrolyte includes two or more chemically compatible polymer components. One or more of the components are crystalline, and one or more of the components are amorphous. At least one of the components is ionic conductive.

In some embodiments, the presently disclosed solid polymer electrolyte can be formed using a physical microphase separation approach. Microphase separation approach is an effective way to obtain polymer electrolyte with relatively good ionic conductivity and high stability simultaneously. Previous phase separation designs of polymer electrolytes are mostly based on chemical linkage of crystalline polymer block with amorphous polymer block, resulting in translucent electrolytes, for example. The present disclosure is directed to a microphase separation of multiple materials that include one or more polar crystalline polymers, one or more polar amorphous polymers, and one or more electrolyte salts. The disclosed solid polymer electrolytes formed by microphase separation are stable and transparent, which can be obtained by designing the polymer structure and tuning the ratios as well as the processing conditions, as described in the disclosed embodiments. In some embodiments, the presently disclosed solid polymer electrolytes allow stable operations of electrochromic devices. The embodiments of the disclosed electrochromic device avoid the problems associated with current electrochromic devices, such as electrolyte leakage, low ionic conductivity, inability to be formed into thin films or thin-film shaped products, low adhesion, etc.

The following description discloses several preferred embodiments of a solid polymer electrolyte, as well as methods and devices for making and using the same.

Solid Polymer Electrolyte

The present disclosure is generally directed to a solid polymer electrolyte that is transparent and has a sufficient ionic conductivity to facilitate ion transport in an electrochromic device.

In one embodiment, the solid polymer electrolyte includes a framework of one or more polar crystalline polymers, one or more polar amorphous polymers, and one or more electrolyte salts. In some embodiments, one or more of the one or more polar crystalline polymers or the one or more polar amorphous polymers are ionic conductive. In some embodiments, the solid polymer electrolyte is formed by microphase separation of the components.

The presently disclosed one or more polar crystalline polymers may include one or more of: C, N, F, O, H, P, etc. In some embodiments, the one or more polar crystalline polymers have an average molecular weight of about 10,000 Daltons or greater. Suitable polar crystalline polymers may include, but are not limited to, Nylon, Polyethylene terephthalate, Poly(methyl methacrylate) (PMMA), polyacrylamide, polyimide, polyvinylchloride (PVC), Polybutylene terephthalate (PBT), Polyether ether ketone (PEEK), Polytetrafluoroethylene (PTFE), Polyvinylidene fluoride (PVDF), Poly(vinylidene fluoride-co-hexafluoropropylene) (PVDF-HFP), high molecular weight polyethylene oxide, polyphenylene sulfide, polyetherimide, polyethersulfone, combinations thereof, etc. In embodiments where a plurality of polar crystalline polymers are present, the polar crystalline polymers may be crosslinked to form a network having enhanced mechanical properties. In some embodiments, the total amount of polar crystalline polymers may be in a range from about 0 wt. % to about 60 wt. % based on the total weight of the solid polymer electrolyte.

The presently disclosed one or more polar amorphous polymers may include one or more of: C, N, O, F, H, P, Si, etc. In some embodiments, the one or more polar amorphous polymers have low crystallinity. The one or more polar amorphous polymers may have a glass transition temperature (Tg) of $-20\,°$ C. or lower. Suitable polar amorphous polymers may include, but are not limited to, polyureathane, polysiloxane, polyethylene oxide, branched polymers, combinations thereof, etc. In some embodiments, one or more of the polar amorphous polymers may have a sufficient amorphicity so as to achieve sufficient ionic conductivity. In some embodiments, the total amount of polar amorphous polymers may be in a range from about 20 wt. % to about 70 wt. % based on the total weight of the solid polymer electrolyte.

As noted above, the presently disclosed solid polymer electrolyte may include one or more electrolyte salts. In some embodiments, the one or more electrolyte salts may comprise one or more organic salts. In some embodiments, the one or more electrolyte salts may comprise one or more inorganic salts (e.g., metal salts). Suitable electrolyte salts may include, but are not limited to, LiTFSI, $LiPF_6$, $LiBF_4$, $LiClO_4$, $LiCF_3SO_3$, $LiN(CF_3SO_2)_2$, Li SbFg, $LiAsF_6$, $LiN(CF_3CF_2SO_2)_2$, $(C_2H_5)_4NBF_4$, $(C_2H_5)_3CH_3NBF_4$, LiI, combinations thereof, etc. In some embodiments, the total amount of electrolyte salt may be in a range from about 10 wt. % to about 50 wt. % based on the total weight of the solid polymer electrolyte.

In some embodiments, the presently disclosed one or more polar amorphous polymers and the one or more electrolyte salts are substantially miscible with the framework of the one or more polar crystalline polymers. Preferably, the components of the presently disclosed solid polymer electrolyte are compatible with each other and can be blended (e.g., via solution processing or extrusion) into a transparent film without any observable particles.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. For example, the presently disclosed solid polymer electrolyte may have a transparency of 80% or higher. Additionally, the solid polymer electrolyte may have an ionic conductivity in a range from about $10^{-6}$ S/cm to about $10^{-4}$ S/cm.

Methods of making the presently disclosed solid polymer electrolyte may include synthesis, polymerization, solvation, and/or other processes as known in the art. In at least one embodiment, the disclosed methods may lead to microphase separation of the multiple materials for making the disclosed solid polymer electrolyte. In some embodiments, the presently disclosed solid polymer electrolyte can be obtained by polymerizing monomers of polar polymers (e.g., the polar crystalline polymers and the polar amorphous polymers). In one particular, non-limiting embodiment, a method of making the presently disclosed solid polymer electrolyte may include: (a) dissolving the framework of one or more polar crystalline polymers, the one or more polar amorphous polymers, and the one or more electrolyte salts in an appropriate solvent; and (b) removing (e.g., by evaporation) the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the framework of polar crystalline polymer(s), polar amorphous polymer(s), and electrolyte salt(s) in the solvent. These experimental parameters may include the components remaining in the solvent, agitation/stirring of the solvent, etc.

Electrochromic Device

An exemplary, non-limiting schematic of an electrochromic device 100 comprising a solid polymer electrolyte is show in FIG. 1, according to one embodiment. The electrochromic device 100 of FIG. 1 may be implemented in combination with other devices/features/components described herein, such as those described with reference to other embodiments/aspects. The electrochromic device 100 may be used in various applications and/or in permutations, which may or may not be noted in the illustrative embodiments/aspects described herein. For instance, the electrochromic device 100 may include more or less features/components than those shown in FIG. 1, in some embodiments. Additionally, unless otherwise specified, one or more components of the electrochromic device 100 may be of conventional material, design, and/or fabricated using known techniques (e.g., lamination, sputtering, chemical vapor deposition (CVD), spray coating, spin coating, printing, etc.), as would be appreciated by skilled artisans upon reading the present disclosure.

As shown in FIG. 1, the electrochromic device 100 includes a first transparent substrate 102 and a second transparent substrate 104 in spaced, parallel relation with one another. The first substrate 102 includes an interior surface 106 and an exterior surface 108. Likewise, the second substrate 104 includes an interior surface 110 and an exterior surface 112, where the interior surface 110 of the second substrate 104 faces the interior surface 106 of the first substrate 102. The first and second substrates 102, 104 may have the same or different dimensions, comprise the same or different material, etc. Suitable material for the first substrate 102 and/or the second substrate 104 may include, but is not limited to, glass, polymeric materials, plastic materials, and/or other materials which are transparent in at least part of the visible region of the electromagnetic spectrum. In some embodiments, the first and second substrates 102, 104 may comprise glass.

As also shown in FIG. 1, a first transparent electrically conductive film 114 is deposited on the interior surface 106 of the first substrate 102 to act as an electrode. A second transparent electrically conductive film 116 is also deposited on the interior surface 110 of the second substrate 104 to act as an electrode. The first and second electrically conductive films 114, 116 may have the same or different dimensions, comprise the same or different material, etc. The first and second electrically conductive films 114, 116 may also each independently have a single layer or multilayer structure. Suitable material for the first and second electrically conductive films 114, 116 may include, but is not limited to, tin doped indium oxide (ITO), fluorine doped indium oxide, antimony doped indium oxide, zinc doped indium oxide, aluminum doped zinc oxide, silver nanowires, carbon nanotube films, patterned metals on glass or plastic substrates, combinations thereof, and/or other such transparent material exhibiting sufficient electrical conductance. In preferred aspects, the first and second electrically conductive films 114, 116 may comprise ITO.

The electrochromic device 100 may additionally include an electrical power supply (not shown) configured to supply voltage between the first and second electrically conductive films 114, 116.

As further shown in FIG. 1, a first layer 118 of electrochromic material is deposited on the interior surface 120 of the first electrically conductive film 114. This electrochromic material is configured to effect a reversible color change upon reduction (gain of electrons) or oxidation (loss of electron) caused by exposure to an electrical current. In some embodiments, the electrochromic material of the first layer 118 may be configured to change from a transparent state to a colored state, or from a colored state to another colored state, upon oxidation or reduction. In some embodiments, the electrochromic material of the first layer 118 may be a polyelectrochromic material in which more than two redox states are possible, and may thus exhibit several colors. The electrochromic material of the first layer 118 may also be a reduction colored material (i.e., a material that becomes colored upon acquisition of electrons), or an oxidation colored material (i.e., a material that becomes colored upon the loss of electrons).

Suitable electrochromic materials for the first layer 118 may include, but is not limited to, inorganic material, conjugated polymers, small organic molecules, metal salts, combinations thereof, etc. In some embodiments, the electrochromic material of the first layer 118 may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the electrochromic material of the first layer 118 may include a metal salt (e.g., $FeCl_3$, etc.). In some embodiments, the electrochromic material may include a conductive polymer such as poly-3,4-ethylenedioxy thiophene (PEDOT), poly-2,2'-bithiophene, polypyrrole, polyaniline (PANI), polythiopene, polyisothianaphthene, poly(o-aminophenol), polypyridine, polyindole, polycarbazole, polyquinone, octacyanophthalocyanine, combinations thereof, etc. Moreover, the electrochromic material of the first layer 118 may include materials, such as viologen, anthraquinone, phenocyazine, combinations thereof, etc.

While not shown in the embodiment of FIG. 1, an optional second layer of electrochromic material may be deposited on the interior surface 122 of the second electrically conductive film 116. The optional second layer of electrochromic material may have the same or different dimensions, comprise the same or different material/composition, etc., as the first layer 118 of electrochromic material. Optionally, a charge storage layer may be deposited on the interior surface 122 of the second electrically conductive film 116. The optional charge storage layer may serve as ion storage and may preferably has electrochromic properties complementary to the electrochromic material of the first layer 118.

As further shown in FIG. 1, a solid polymer electrolyte 124, such as those disclosed herein, is positioned between the first layer 118 of electrochromic material and the second electrically conductive film 116. In embodiments where the electrochromic device 100 includes the first layer 118 of electrochromic and the optional second layer of electrochromic material, the solid polymer electrolyte 124 may be positioned therebetween.

In some embodiments, the electrochromic device 100 of the present disclosure includes a solid polymer electrolyte, such as the solid polymer electrolyte 124 described above, and does not include any liquid or gel electrolyte.

The use of the solid polymer electrolyte 124 in the electrochromic device 100 provides several advantages. For instance, the solid polymer electrolyte disclosed herein (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ionic conductivities as compared to convention polymer electrolytes; etc.

EXAMPLES

An exemplary solid polymer electrolyte according to the present disclosure was prepared as follows.

10 grams of PVDF-HFP polymer was combined with a certain amount (e.g., 2 grams, 5 grams, or 10 grams) of PEO oligomer methyl ether. PVDF-HFP served as a polar crystalline polymer framework, while PEO oligomers served as polar amorphous components as well as ion conductors. The above-mentioned combined components were further combined with a certain amount of lithium salts (e.g., about 30 wt. % LiTFSI based on the weight of the PEO oligomers). The combined components were mixed in an acetone solvent and stirred overnight to obtain a solution. The solution was processed and deposited onto an electrochromic layer or substrate via slot die coating or spin-coating, for example. After drying the solvent, the resulting solid electrolyte was found to be a uniform transparent film with an ionic conductivity of about $10^{-5}$ S/cm. The resulting solid electrolyte film may be used to assemble an electrochromic device. As the ratio of PEO increased in the solid electrolyte, the ionic conductivity increased but the mechanical strength decreased and the transparency of the film changed.

Figure 2:
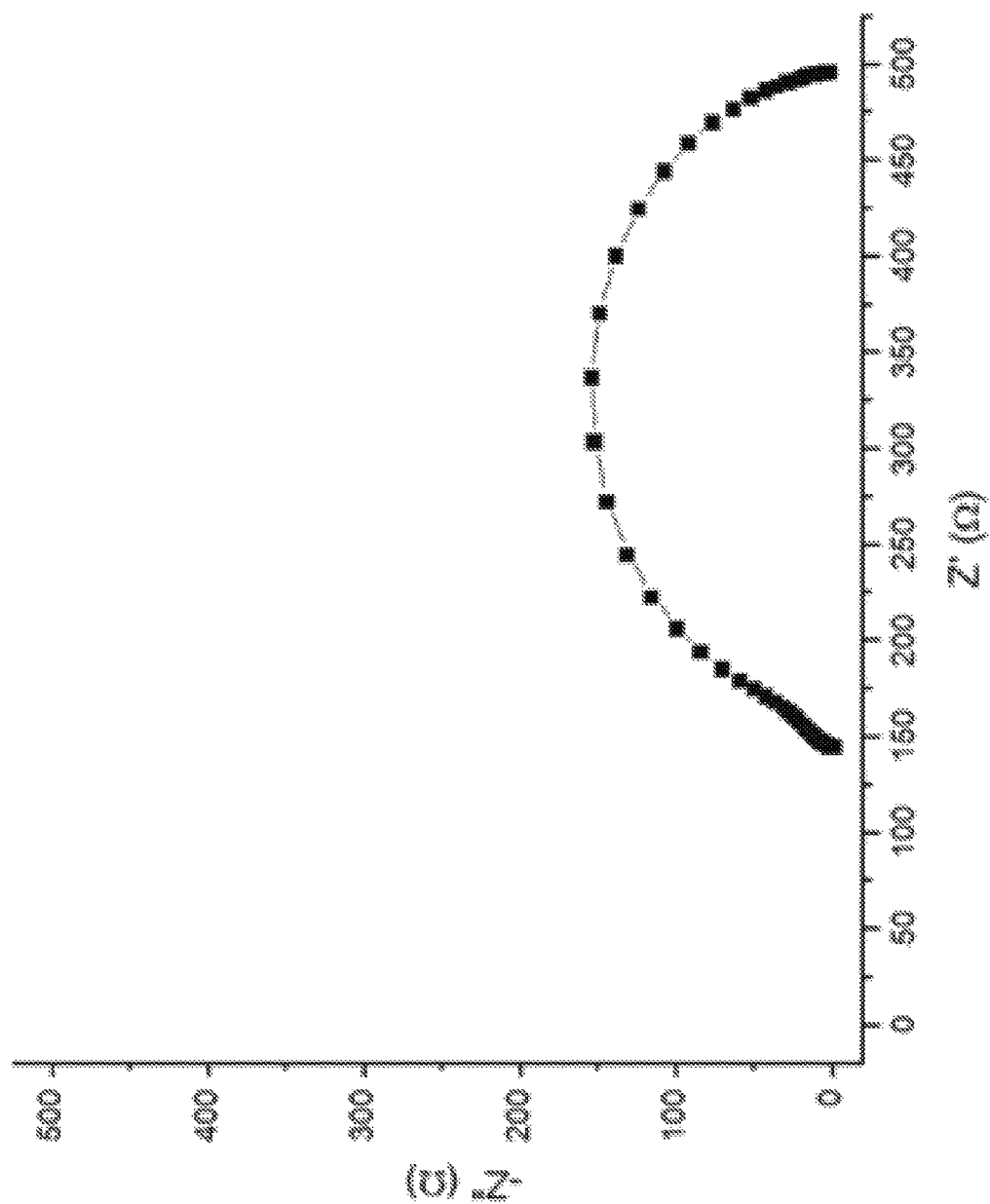
FIG. 2 is a graphical presentation showing resistive property of an exemplary cell with a solid polymer electrolyte, consistent with exemplary embodiments in the present disclosure.

A solid polymer electrolyte prepared according to the aforementioned procedure may be used to form a cell. To form the cell, the solid polymer electrolyte may be sandwiched between two Polyethylene terephthalate (PET) films coated with electronic conductive indium doped tin oxide (ITO). The resistive property of an exemplary cell is shown in FIG. 2. The surface resistant of such PET/ITO film is 100 ohm/square. The electrochemical AC impedance was measured by connecting two PET/ITO to a frequency analyzer. A typical impedance spectrum of a cell with the polymer electrolyte (25 um) has a total resistance of ~500 Ohm. The lithium conductivity of the film was calculated to be $10^{-5}$ S/cm.

Figure 3:
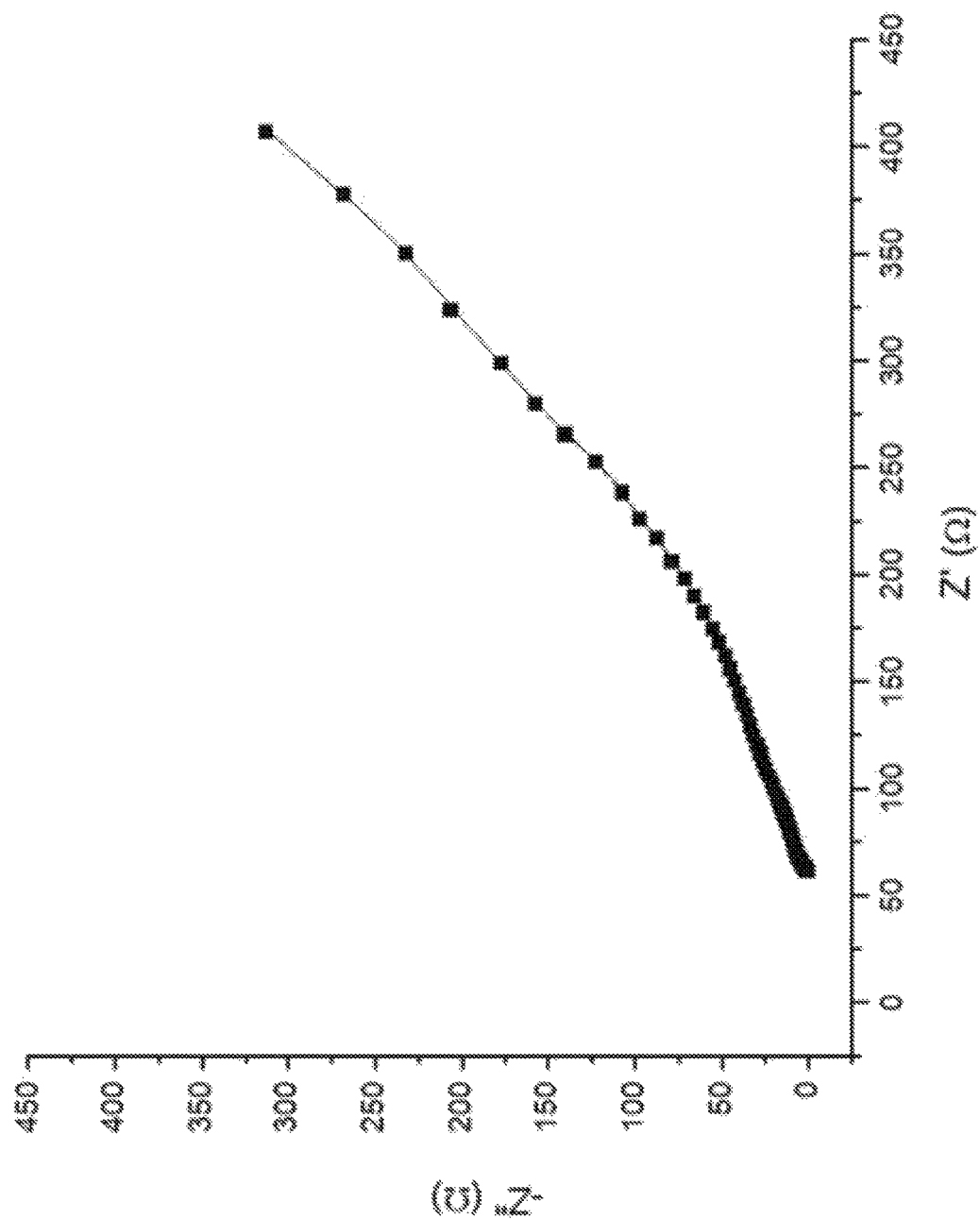
FIG. 3 is a graphical presentation showing resistive property of an exemplary electrochemical device with a solid polymer electrolyte, consistent with exemplary embodiments in the present disclosure.
Figure 4:
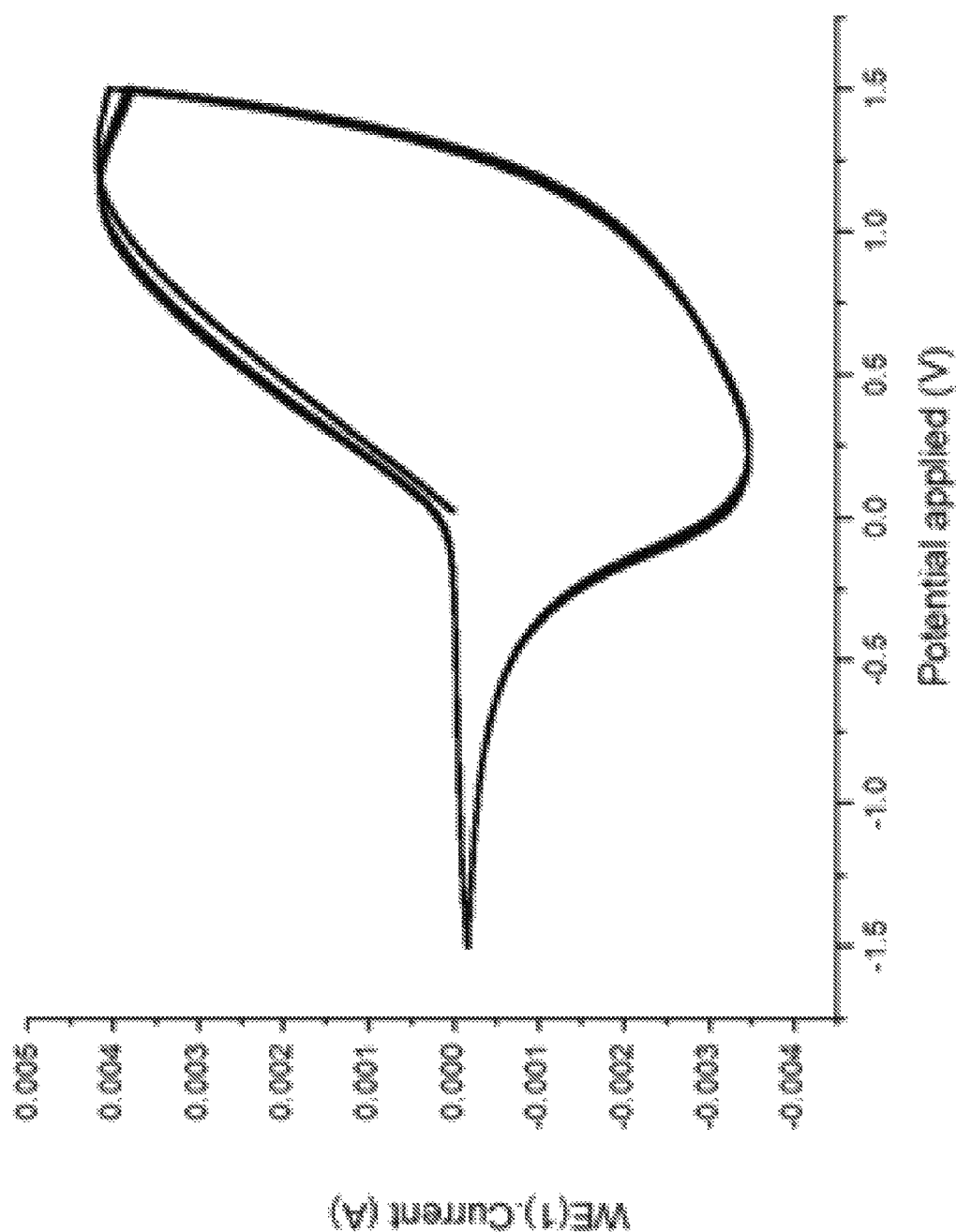
FIG. 4 is a graphical presentation showing cyclic voltammogram measurement results of an exemplary electrochemical device with a solid polymer electrolyte, consistent with exemplary embodiments in the present disclosure.

An electrochemical device can be fabricated with the aforementioned solid polymer electrolyte, and poly((2,2-bis (2-ethylhexyloxymethyl)-propylene-1,3-dioxy)-3,4-thiophene-2,5-diyl) may be used as the electrochromic (EC) layer. The EC layer can be coated on top of ITO/PET substrate via slot die coating method with 550 nm as the dry film thickness. A $MoO_3$ coated ITO/PET can be served as the ion storage layer (or say as counter electrode). The electrochromic device may be evaluated using a frequency analyzer paired with a potentiostat. As shown in FIG. 3, the internal resistance of the device is found to be ~200 Ohm. Cyclic voltammogram shows a pair of high reversible redox peak (0.25 V for reduction and 1.0V for oxidation) at a scan rate of 10 mV/s, as seen in FIG. 4. The device can rapid switch its color in a voltage window of −1.2-1.2V.

Application/Uses

Embodiments of the presently disclosed solid polymer electrolyte may be used in various applications, devices, industries etc. Particular applications of the presently disclosed solid polymer electrolyte involve use in electrochromic devices. Electrochromic devices are often associated with smart window and display technology, e.g., anti-glare car mirrors; smart windows configured to modulate the transmission or reflected solar radiation for use in cars, aircrafts, buildings, and the like; protective eyewear; camouflage and/or chameleonic materials; etc.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A solid polymer electrolyte, comprising:
a framework of one or more polar crystalline polymers;
one or more polar amorphous polymers; and
one or more electrolyte salts;
wherein the one or more polar crystalline polymers or the one or more polar amorphous polymers are ionic conductive;
wherein the one or more polar crystalline polymers is Poly(vinylidene fluoride-co-hexafluoropropylene) PVDF-HFP in a range from 0 wt. % to 60 wt. % based on the total weight of the solid polymer electrolyte; and
wherein the one or more polar amorphous polymers is polyethylene oxide (PEO) oligomers in a range from 20 wt. % to 70 wt. % based on the total weight of the solid polymer electrolyte;
wherein the one or more electrolyte salts is LiTFSI in about 30% wt. based on the total weight of the solid polymer electrolyte.

2. The solid polymer electrolyte of claim 1, wherein the one or more polar amorphous polymers have a glass transition temperature (Tg) of -20 ° C. or lower.

3. The solid polymer electrolyte of claim 1, wherein the one or more polar amorphous polymers and the one or more electrolyte salts are substantially miscible with the framework of the one or more polar crystalline polymers.

4. The solid polymer electrolyte of claim 1, wherein the solid polymer electrolyte has a transparency of 80% or higher.

5. The solid polymer electrolyte of claim 1, wherein the solid polymer electrolyte does not include a liquid or a gel component.

6. The solid polymer electrolyte of claim 1, wherein the solid polymer electrolyte has an ionic conductivity between $10^{-6}$ Siemens/cm and $10^{-4}$ Siemens/cm.

7. An electrochromic device, comprising:
a first electrode;
a second electrode;
an electrochromic material deposited on at least the first electrode; and
a solid polymer electrolyte disposed between the electrochromic material and the second electrode, wherein the solid polymer electrolyte comprises:
a framework of one or more polar crystalline polymers;
one or more polar amorphous polymers; and
one or more electrolyte salts;
wherein the one or more polar crystalline polymers or the one or more polar amorphous polymers are ionic conductive;
wherein the one or more polar crystalline polymers is Poly(vinylidene fluoride-co-hexafluoropropylene) PVDF-HFP in a range from 0 wt. % to 60 wt. % based on the total weight of the solid polymer electrolyte; and
wherein the one or more polar amorphous polymers is polyethylene oxide (PEO) oligomers in a range from 20 wt. % to 70 wt. % based on the total weight of the solid polymer electrolyte;
wherein the electrolyte salt is LiTFSI in about 30% wt. based on the total weight of the solid polymer electrolyte.

8. The electrochromic device of claim 7, further comprising another electrochromic material deposited between the solid polymer electrolyte and the second electrode.

9. The electrochromic device of claim 7, wherein the one or more polar amorphous polymers and the one or more electrolyte salts are substantially miscible with the framework of the one or more polar crystalline polymers.

10. The electrochromic device of claim 7, wherein the electrochromic material is selected from the group consisting of: inorganic material, conjugated polymers, small organic molecules, metal salts, and combinations thereof.

11. The electrochromic device of claim 7, further comprising a charge storage layer deposited between the solid polymer electrolyte and the second electrode.

12. A method of making a solid polymer electrolyte, comprising:
forming the solid polymer electrolyte by microphase separation of multiple materials comprising:
one or more polar crystalline polymers;
one or more polar amorphous polymers; and
one or more electrolyte salts; wherein the one or more polar crystalline polymers, the one or more polar amorphous polymers, and the one or more electrolyte salts are blended together into a transparent film by using solution processing or extrusion;
wherein the one or more polar crystalline polymers or the one or more polar amorphous polymers are ionic conductive;
wherein the one or more polar crystalline polymers is Poly(vinylidene fluoride-co-hexafluoropropylene) PVDF-HFP in a range from 0 wt. % to 60 wt. % based on the total weight of the solid polymer electrolyte; and
wherein the one or more polar amorphous polymers is polyethylene oxide (PEO) oligomers in a range from 20 wt. % to 70 wt. % based on the total weight of the solid polymer electrolyte;
wherein the electrolyte salt is LiTFSI in about 30% wt. based on the total weight of the solid polymer electrolyte.

13. The method of claim 12, further comprising:
dissolving the one or more polar crystalline polymers, the one or more polar amorphous polymers, and the one or more electrolyte salts in at least one solvent; and
removing the at least one solvent by evaporation of the at least one solvent.

* * * * *